US008835055B2

(12) United States Patent
Chang et al.

(10) Patent No.: US 8,835,055 B2
(45) Date of Patent: *Sep. 16, 2014

(54) CATHODE ACTIVE MATERIAL FOR LITHIUM SECONDARY BATTERY

(75) Inventors: Sung Kyun Chang, Incheon (KR); Seung Tae Hong, Daejeon (KR); Hyeong Jin Kim, Daejeon (KR); Duk Hyun Ryu, Daejeon (KR); Eun Young Goh, Goyang-si (KR); Ho Chun Lee, Daejeon (KR); Jun Yong Jeong, Daejeon (KR); Jin Hee Yeon, Daejeon (KR); Hyung Keun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,048

(22) Filed: Sep. 14, 2012

(65) Prior Publication Data

US 2013/0011727 A1    Jan. 10, 2013

Related U.S. Application Data

(63) Continuation of application No. 12/558,100, filed on Sep. 11, 2009, which is a continuation-in-part of application No. 10/950,104, filed on Sep. 24, 2004, now Pat. No. 7,695,867, which is a continuation-in-part of application No. 10/478,802, filed as application No. PCT/KR02/02267 on Dec. 2, 2002, now Pat. No. 7,282,300.

(30) Foreign Application Priority Data

| Mar. 22, 2002 | (KR) | 10-2002-0015713 |
| Jun. 27, 2002 | (KR) | 10-2002-0036438 |
| Sep. 26, 2003 | (KR) | 10-2003-0066865 |
| Sep. 26, 2003 | (KR) | 10-2003-0066866 |

(51) Int. Cl.

| H01M 4/13 | (2010.01) |
| C01G 53/04 | (2006.01) |
| H01M 4/505 | (2010.01) |
| H01M 4/36 | (2006.01) |
| H01M 10/0525 | (2010.01) |
| H01M 4/525 | (2010.01) |
| H01M 4/131 | (2010.01) |
| H01M 4/136 | (2010.01) |
| H01M 4/58 | (2010.01) |

(52) U.S. Cl.
CPC .............. *H01M 4/131* (2013.01); *Y02E 60/122* (2013.01); *H01M 4/505* (2013.01); *H01M 4/366* (2013.01); *H01M 4/136* (2013.01); *H01M 10/0525* (2013.01); *H01M 4/525* (2013.01); *H01M 4/5825* (2013.01); *H01M 4/364* (2013.01)
USPC ............ 429/223; 429/231.1; 252/182.1; 423/594.3

(58) Field of Classification Search
CPC ....................................................... H01M 4/525
See application file for complete search history.

(56) References Cited

U.S. PATENT DOCUMENTS

| 5,429,890 A * | 7/1995 | Pynenburg et al. ........... 429/310 |
| 5,759,719 A * | 6/1998 | Mao .............................. 429/223 |
| 5,783,333 A | 7/1998 | Mayer |
| 5,817,436 A * | 10/1998 | Nishijima et al. ............. 429/223 |
| 5,955,219 A * | 9/1999 | Nishijima et al. ............. 429/220 |
| 6,159,636 A * | 12/2000 | Wang et al. .................... 429/223 |
| 6,682,850 B1 * | 1/2004 | Numata et al. ................. 429/224 |
| 2003/0003352 A1 | 1/2003 | Kweon et al. |
| 2003/0031930 A1* | 2/2003 | Hamano et al. ............ 429/231.3 |
| 2004/0157124 A1* | 8/2004 | Goh et al. ................... 429/231.1 |
| 2005/0130044 A1 | 6/2005 | Aoshima et al. |

FOREIGN PATENT DOCUMENTS

| CN | 1206501 A | 1/1999 |
| EP | 0 656 667 A1 | 6/1995 |
| EP | 0794155 A1 | 9/1997 |
| EP | 0935302 A1 | 8/1999 |
| EP | 1256996 A1 | 11/2002 |
| JP | 06342673 | 12/1994 |
| JP | 7235291 | 9/1995 |
| JP | 08-153541 | 6/1996 |
| JP | 09-241026 A | 9/1997 |
| JP | 09-241027 A | 9/1997 |
| JP | 10-158017 A | 6/1998 |
| JP | 10208730 | 8/1998 |
| JP | 2000077071 | 3/2000 |
| JP | 2000502831 | 3/2000 |
| JP | 2000-106211 | 4/2000 |
| JP | 2000113908 | 4/2000 |
| JP | 2000149996 | 5/2000 |
| JP | 2001243943 | 9/2001 |
| JP | 2003-272705 A | 9/2003 |
| WO | WO 97 24773 | 7/1997 |
| WO | WO 0013250 A1 * | 3/2000 |
| WO | WO 03/081697 A1 | 10/2003 |

OTHER PUBLICATIONS

Chinese Office Action dated Mar. 4, 2005 for Application No. 02812484.7.
European Search Report for Patent Application No. 10187897.3 on Dec. 1, 2010.
International Search Report dated Mar. 26, 2003 for Application No. PCT/KR02/02267.
Japanese Office Action dated Aug. 13, 2010 for JP Application No. 2005-518284.
PCT International Search Report; PCT/KR2004/002461; Dated: Mar. 7, 2005.
Supplementary European Search Report issued in the corresponding European Patent Application No. 04774711.8 on Sep. 3, 2009.
Translation of CN OA dated Nov. 17, 2006.

* cited by examiner

*Primary Examiner* — Maria J Laios
*Assistant Examiner* — Robert S Carrico
(74) *Attorney, Agent, or Firm* — Birch, Stewart, Kolasch & Birch, LLP

(57) ABSTRACT

Disclosed is a lithium secondary battery, which is low in capacity loss after overdischarge, having excellent capacity restorability after overdischarge and shows an effect of preventing a battery from swelling at a high temperature.

13 Claims, 12 Drawing Sheets

CATHODE ACTIVE MATERIAL FOR LITHIUM SECONDARY BATTERY

CROSS-REFERENCE TO RELATED APPLICATIONS

This application is a Continuation of co-pending application Ser. No. 12/558,100 filed on Sep. 11, 2009, which was a continuation-in-part of U.S. application Ser. No. 10/950,104, filed Sep. 24, 2004, now U.S. Pat. No. 7,695,867, issued Apr. 13, 2010, which was a continuation-in-part of U.S. application Ser. No. 10/478,802, filed Nov. 25, 2003, now U.S. Pat. No. 7,282,300, issued Oct. 16, 2007, which was the National Stage of International Application No. PCT/KR02/02267, filed Dec. 2, 2002, and which claims priority to Korean Application Nos. 10-2003-0066865 and 10-2003-0066866, both filed Sep. 26, 2003, Korean Application No. 10-2002-15713, filed Mar. 22, 2002, and Korean Application No. 10-2002-36438, filed Jun. 27, 2002, and all the benefits accruing therefrom under 35 U.S.C. 119, the content of which is incorporated herein by reference in its entirety.

TECHNICAL FIELD

The present invention relates to a lithium secondary battery, which is low in capacity loss after overdischarge, having excellent capacity restorability after overdischarge and shows an effect of preventing a battery from swelling at a high temperature.

BACKGROUND ART

Recently, as mobile communication industries and information electronic industries progress in various technologies, a light-weight, high-capacity lithium secondary battery is increasingly in demand. However, a lithium secondary battery may ignite and explode due to extreme heat emission when it is over-charged or is in a short circuit state. Moreover, when a lithium secondary battery is overdischarged below a normal voltage range, its capacity is significantly reduced, preventing forthcoming use.

For these reasons, a safety device like a protection circuit, a PTC element, etc., has been attached to a lithium secondary battery since lithium secondary batteries were first developed. However, such protection circuits, PTCs, etc., are not preferable because they are expensive and take up a large volume, thereby increasing the price, volume and weight of a battery. Therefore, batteries with a reduced manufacturing cost and an increased battery capacity without using such a protection circuit, PTC, etc., are very much in demand.

Conventionally, an organic or an inorganic additive is used in a non-aqueous electrolyte, or the outer structure of a battery is changed for the purpose of ensuring battery safety when a battery is over-charged or has short-circuited. However, when a battery is overdischarged below an adequate voltage, even if one tries to charge the battery again, the battery capacity is so significantly reduced that the battery are no longer capable of charge/discharge.

Conventional lithium secondary batteries developed hitherto have a structure in which discharge is limited and terminated by an anode during overdischarge. Particularly, when a non-aqueous lithium secondary battery is first charged, a solid electrolyte interface (SEI) film is formed on the surface of an anode. In this case, a great amount of lithium ions released from a cathode are used and thus the amount of Li participating in charge/discharge is reduced. When over-discharging occurs in the state in which the amount of Li is reduced, activated Li sites in the cathode are not fully occupied and the cathode voltage is not decreased below a certain voltage. Therefore, discharge is terminated by the anode (see FIG. 1).

Meanwhile, a battery capacity is significantly reduced by the following reasons. A battery voltage is defined by a difference between a cathode voltage and an anode voltage. Additionally, a battery is continuously discharged at a low electric current, even after the battery voltage is decreased below a general-use voltage. At this case, due to the consumption of Li ion in the anode, the cathode voltage is no longer reduced and thus it is slowly decreased. On the other hand, the anode voltage rapidly increases and eventually rises to 3.6 V, at which point a copper foil used as an anode collector is oxidized. Thus, the copper foil is dissolved in a copper ion state to contaminate an electrolyte. After that, when the battery is re-charged the copper ion is attached again to the surface of the anode and thus the anode active material becomes unusable. Therefore, if oxidization of the copper foil occurs, the battery capacity is rapidly reduced after overdischarge, so that the battery becomes unusable.

Accordingly, it is desirable to develop a battery, discharge of which is limited by a cathode, so that the battery capacity may not be significantly reduced after overdischarge. Further, a new method for making such a cathode-limited battery is very much in demand.

DISCLOSURE OF THE INVENTION

As mentioned above, there is a problem that the voltage of an anode having a relatively high irreversible capacity increases rapidly, when overdischarging occurs, and thus copper ions are dissolved from an anode collector, so that charge/discharge cycles may not progress successfully. In order to prevent the increase of the voltage in an anode during overdischarge, it is desirable to increase the irreversible capacity of a cathode so as to decrease the voltage of the cathode more rapidly. For the purpose of increasing the irreversible capacity of a cathode, the present invention adopted a method of adding an additive having a high irreversible capacity to a cathode.

We have found that, when a lithium nickel oxide represented by the following formula 1 is used as an additive for a cathode active material, a phase transition occurs in the lithium nickel oxide to control irreversible reactions in a cathode and an anode, and thus the battery capacity is not significantly reduced after overdischarge.

Therefore, the present invention has been made based on this finding. It is an object of the present invention to provide a battery, the discharge of which is limited by a cathode, using a cathode active material comprising a lithium nickel oxide represented by the following formula 1 as an additive, so that the battery capacity may not be significantly reduced after overdischarge.

Meanwhile, the lithium nickel oxide may cause swelling of a battery at a high temperature depending on its added amount. With regard to this, we have found that when a lithium nickel oxide represented by the following formula 1, in which nickel is partially substituted with other elements, is used as an additive for a cathode active material, the battery capacity is not significantly reduced after overdischarge while maintaining overall performance of the battery, and furthermore, it is possible to obtain excellent capacity restorability after overdischarge and to prevent a battery from swelling at a high temperature. We have also found that when a lithium nickel oxide represented by the following 1 that is coated with an oxide other than lithium nickel oxides, is used as an additive for a cathode active material, the battery capacity is not significantly reduced after overdischarge while maintaining overall performance of the battery, and furthermore, it is possible to obtain excellent capacity restorability after overdischarge and to prevent the battery from swelling at a high temperature, in this case too.

According to an aspect of the present invention, there is provided a cathode active material for a lithium secondary battery containing a lithium transition metal oxide capable of lithium ion intercalation/deintercalation, which further comprises a lithium nickel oxide represented by the following formula 1 in which nickel is partially substituted with other elements (with the proviso that y is not 0), or a lithium nickel oxide represented by the following formula 1 that is surface-coated with an oxide other than lithium nickel oxides, as an additive in an amount of 0.1 to 9 parts by weight based on 100 parts by weight of the total cathode active material:

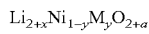
[formula 1]

wherein, x is a number satisfying $-0.5 \leq x \leq 0.5$, y is a number satisfying $0 \leq y < 1$, a is a number satisfying $0 \leq a < 0.3$, and M is at least one element selected from the group consisting of P, B, C, Al, Sc, Sr, Ti, V, Zr, Mn, Fe, Co, Cu, Zn, Cr, Mg, Nb, Mo and Cd.

According to still another aspect of the present invention, there is provided is a lithium secondary battery comprising the above-described cathode active material.

The lithium secondary battery according to the present invention comprises: (a) a cathode comprising the cathode active material according to the present invention, (b) an anode, (c) a separator, and (d) a non-aqueous electrolyte containing a lithium salt and an electrolyte compound.

The present invention will be explained in detail hereinafter.

The lithium nickel oxide used as an additive for a cathode active material according to the present invention is represented by the following formula 1:

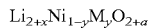
[formula 1]

wherein, x is a number satisfying $-0.5 \leq x \leq 0.5$, y is a number satisfying $0 \leq y < 1$, a is a number satisfying $0 \leq a < 0.3$, and M is at least one element selected from the group consisting of P, B, C, Al, Sc, Sr, Ti, V, Zr, Mn, Fe, Co, Cu, Zn, Cr, Mg, Nb, Mo and Cd.

Preferably, the oxide other than lithium nickel oxides, used for surface-coating of the lithium nickel oxide represented by formula 1 is an oxide or composite oxide of at least one element selected from the group consisting of Al, Mg, Si, P, C, Sc, Ti, V, Cr, Mn, Fe, Co, Cu, Zn, Mo, Zr and Nb. Particular examples of the oxide or composite oxide include $Al_2O_3$, $ZrO_2$, $AlPO_4$, $SiO_2$, $TiO_2$ and MgO but are not limited thereto.

The compound represented by formula 1 preferably belongs to the space group Immm. More preferably, in the stereostructure of the compound, a Ni/M composite oxide forms a tetra-coordinated planar structure $(Ni,M)O_4$ and two tetra-coordinated planar structures facing to each other share one side (formed by O—O), thereby forming a primary chain as a whole. Additionally, the compound represented by formula 1 preferably has the following lattice constants: $a=3.7\pm0.5$ Å, $b=2.8\pm0.5$ Å and $c=9.2\pm0.5$ Å, wherein $\alpha=90°$, $\beta=90°$ and $\gamma=90°$.

As shown in FIGS. 6 to 9, a lithium nickel oxide of formula 1 in which nickel is partially substituted with other elements shows an X-ray diffraction pattern (FIGS. 6 to 8) similar to that of $Li_2NiO_2$ (FIG. 9). This indicates that although nickel in the lithium nickel oxide is partially substituted with other elements, the lithium nickel oxide is not changed in structure.

In the structure of the compound represented by formula 1, Li ion intercalation/deinterlation occurs during the first charge/discharge cycle, wherein the oxidation number of Ni or M is changed from +2 to +4 and the structure of $Li_{2+x}Ni_{1-y}M_yO_{2+a}$ experiences a phase transition into $Li_{2+x-z}Ni_{1-y}M_yO_2$ (wherein $0 \leq z < 2$).

For example, $LiNiO_2$ has a lattice structure that belongs to the space group R3-m (trigonal hexagonal), wherein a=b, i.e., a is the same as b, c is different from them, alpha=beta=90° and gamma=120°.

The compound represented by formula 1 deintercalates at least one mole of lithium ion during the first charge cycle, however, on and after discharge of the first cycle, it becomes a substance capable of lithium ion intercalation/deintercalation in an amount of one mole or less.

For example, in the case of $Li_2NiO_2$, contrary to $LiNiO_2$, one mole or more of lithium ions are donated to an anode during charge and one mole or less of lithium ions are accepted by a cathode during discharge. Therefore, the discharge efficiency (the first discharge capacity/the first charge capacity×100) of $Li_2NiO_2$ in the first charge/discharge cycle is about 40% or less. In the case of the compound represented by formula 1, $Li_{2+x}Ni_{1-y}M_yO_{2+a}$, discharge efficiency in the first charge/discharge slightly varies with the content of the metal M substituting for Ni.

Accordingly, when the lithium nickel oxide represented by formula 1 is used in a cathode as an additive for a cathode active material, the cathode active material composition according to the present invention shows a large difference between initial charge capacity and initial discharge capacity. This irreversible capacity provides lithium ions at least in such an amount as to compensate for an irreversible lithium-consuming reaction in an anode caused by the SEI film formation on the surface of an anode during the first charge. Therefore, it is possible to compensate for the high irreversible capacity of the anode at the first charge/discharge cycle.

In addition, the cathode active material composition according to the present invention, which comprises a lithium transition metal oxide capable of lithium ion intercalation/deintercalation and the lithium nickel oxide represented by formula 1 can inhibit the capacity reduction caused by overdischarge, by virtue of the irreversibility of the lithium nickel oxide represented by formula 1 during the first charge/discharge cycle. This mechanism is shown in FIG. 1.

A battery voltage is defined by the difference of electric potentials between a cathode and an anode. Overdischarge of a battery continuously proceeds until the battery voltage becomes 0 V, at which point the electric potentials of a cathode and an anode are the same.

As mentioned above, in general, the voltage of an anode having a relatively high irreversible capacity increases rapidly, when overdischarging occurs, and thus copper ions are dissolved from an anode collector, so that charge/discharge cycles may not progress successfully. The above-described overdischarging problem results from that an irreversibility of lithium transition metal oxide used as a cathode active material in general is smaller than that of carbon-based anode active material. In order to prevent the increase of the voltage in an anode during overdischarge, it is desirable to increase the irreversible capacity of a cathode so as to decrease the voltage of the cathode rapidly. For the purpose of increasing the irreversible capacity of a cathode, the present invention adopted a method of adding an additive having a high irreversible capacity to a cathode.

According to the present invention, a cathode for a lithium secondary battery is formed by adding to a cathode active material containing a first lithium transition metal oxide capable of lithium ion intercalation/deintercalation, a second lithium transition metal oxide of which an irreversible capacity, (1−discharge capacity/charge capacity) in the first charge/discharge cycle is greater than that of the first lithium transition metal oxide, as an additive. As a result, it is possible to regulate terminal voltage of a cathode when the electric potential difference (voltage) between a cathode and an anode is 0V during overdischarge.

The irreversible capacity of the additive in the first charge/discharge cycle should be greater than 4%, i.e., the irreversible capacity of the general cathode active material. The preferable irreversible capacity of the additive is 30% or greater.

Additionally, in order to reduce the amount of the additive, it is preferable that the irreversible capacity (actual capacity per se rather than capacity ratio) of the additive is relatively high.

Preferably, the used amount of the additive can provide irreversibly lithium ions at least in such an amount as to compensate for an irreversible lithium-consuming reaction in an anode caused by the SEI film formation on the surface of an anode during the first charge. Since the irreversible capacity of the anode is 8% in general, the preferable irreversible capacity of the additive is 8% or more in order to reduce the amount of the additive.

According to the present invention, when the compound represented by formula 1 is added to a cathode to the extent of compensating for the irreversible capacity of an anode, it is possible to obtain very excellent performance in an overdischarge test of a SCF (safety circuit free) battery, which does not need a protection circuit. The SCF battery has peaked the interest to battery production companies recently.

Meanwhile, when the lithium nickel oxide is added to the cathode of a lithium secondary battery as an additive for the cathode active material, Ni in the lithium nickel oxide, which is present in an oxidized state with a valence of +4, may react with an electrolyte during charge to generate gas. Therefore, swelling of a battery may occur at a high temperature depending on the added amount of the lithium nickel oxide. However, the anode and cathode should be in close contact to each other because a non-aqueous lithium secondary battery has low ion conductivity. Accordingly, when swelling of a battery occurs, the contact degree between an anode and a cathode may decrease, thereby increasing electric resistance.

Further, the problem of swelling of a battery at a high temperature in the case of $Li_2NiO_2$ is severe, contrary to $LiNiO_2$.

To solve this problem, according to the present invention, there is provided a cathode active material for a lithium secondary battery containing a lithium transition metal oxide capable of lithium ion intercalation/deintercalation, which further comprises a lithium nickel oxide represented by formula 1 in which nickel is partially substituted with other elements (with the proviso that y is not 0), or a lithium nickel oxide represented by formula 1 that is surface-coated with an oxide other than lithium nickel oxides, as an additive.

In the compound represented by formula 1 in which nickel is partially substituted with at least one element M selected from the group consisting of P, B, C, Al, Sc, Sr, Ti, V, Zr, Mn, Fe, Co, Cu, Zn, Cr, Mg, Nb, Mo and Cd, bonds originally present in the lithium nickel oxide are substituted with stronger bonds so that a battery can be prevented from swelling at a high temperature.

The compound represented by formula 1 may be prepared by reacting a salt, metal salt, organo-metallic salt or oxide of at least one element selected from the group consisting of P, B, C, Al, Sc, Sr, Ti, V, Zr, Mn, Fe, Co, Cu, Zn, Cr, Mg, Nb, Mo and Cd together with a lithium salt and nickel salt by using a reaction method such as a solid phase reaction, co-precipitation method and a sol-gel method. Methods other than the above-mentioned methods may also be used to prepare the compound represented by formula 1.

Additionally, the additive for a cathode active material according to the present invention may be obtained by surface-coating a lithium nickel oxide of formula 1 (including y=0) with an oxide other than lithium nickel oxides, such as an oxide or composite oxide of at least one element selected from the group consisting of Al, Mg, Si, P, C, Sc, Ti, V, Cr, Mn, Fe, Co, Cu, Zn, Mo, Zr and Nb. The surface-coating as described above can prevent Ni in an oxidized state with a valence of +4 from reacting with an electrolyte and thus prevent gas generation caused by the reaction between Ni and an electrolyte. Therefore, it is possible to prevent swelling of a battery at high temperature.

The lithium nickel oxide represented by formula 1 that is surface-coated with an oxide other than lithium nickel oxides may be prepared by surface-coating a lithium nickel oxide represented by formula 1 with a solution containing a salt, metal salt or organo-metallic salt of at least one element selected from the group consisting of Al, Mg, Si, P, C, Sc, Ti, V, Cr, Mn, Fe, Co, Cu, Zn, Mo, Zr and Nb, mixed in the form of sol-gel or dissolved in an organic solvent or water.

Surface-coating methods may include a precipitation method, a filtering method, a vacuum drying method, a CVD (Chemical Vapor Deposition) method, a sputtering method, etc., but are not limited thereto. The precipitation method is carried out by introducing a lithium nickel oxide into a solution containing a compound containing at least one element selected from the group consisting of Al, Mg, Si, P, C, Sc, Ti, V, Cr, Mn, Fe, Co, Cu, Zn, Mo, Zr and Nb, for example, aluminum isopropoxide, zirconium propoxide, aluminum nitrate, magnesium acetate, etc., mixed in the form of sol-gel or dissolved in an organic solvent or water, so that precipitate slurry can be obtained. The filtering method is carried out by separating the slurry by using a depressurization filter. Additionally, the vacuum drying method is carried out by completely drying the solvent contained in the slurry in a vacuum drier.

The additive for a cathode active material according to the present invention is preferably used in an amount of 0.1 to 9 parts by weight based on 100 parts by weight of the cathode active material. When the content of the additive for a cathode active material is less than 0.1 parts by weight, the voltage of an anode increases in advance of the reduction of the voltage of a cathode during an overdischarge test. Therefore, when the anode voltage reaches a certain range of voltage more than 3.6V (at which point a copper foil as an anode collector is oxidized), the problem of copper ion dissolution may occur in the cases of pouch type batteries, prismatic batteries and cylindrical batteries. As a result, a battery may be damaged so that charge/discharge cycles of the battery are thwarted after overdischarge. Additionally, when the content of the additive for a cathode active material is more than 10 parts by weight, the voltage of a cathode decreases rapidly during an overdischarge test, and thus a battery may show an excellent effect in the overdischarge test. However, reduction of an electrolyte may occur in the surface of the cathode and the battery capacity may be decreased. Therefore, in order to solve both problems in a cathode and an anode, the cathode potential preferably ranges from 2 V to 3.6 V and the anode potential is preferably 3.6 V or less, when the full cell voltage becomes 0 V.

The overdischarge test is carried out as follows: discharging to 3.0V at 300 mA, discharging to 2.7V at 3 mA and discharging to 0V at 1 mA.

The cathode active material used in the present invention is any one of conventional cathode active materials, however, it is preferable to use a lithium transition metal oxide. For example, at least one lithium transition metal oxide selected from the group consisting of $LiCoO_2$, $LiNiO_2$, $LiMnO_2$, $LiMn_2O_4$, $Li(Ni_aCo_bMn_c)O_2$ (wherein $0<a<1, 0<b<1, 0<c<1$ and $a+b+c=1$), $LiNi_{1-d}Co_dO_2$, $LiCo_{1-d}Mn_dO_2$, $LiNi_{1-d}Mn_dO_2$ (wherein $0\le d<1$), $Li(Ni_xCo_yMn_z)O_4$ (wherein $0<x<2$, $0<y<2$, $0<z<2$ and $x+y+z=2$), $LiMn_{2-n}Ni_nO_4$, $LiMn_{2-n}Co_nO_4$ (wherein $0<n<2$), $LiCoPO_4$, $LiFePO_4$, etc., may be used and $LiCoO_2$ is preferably used.

As an anode active material, graphite, carbon, lithium metal and alloys, etc., which are capable of lithium ion intercalation/deintercalation, may be used. Preferably, artificial graphite is used. The anode may comprise a binder, the binder being preferably PVDF (Polyvinylidene fluoride) or SBR (Styrene Butadiene Rubber).

As a separator, a porous separator is preferably used. For example, a polypropylene-, a polyethylene- or a polyolefin-based porous separator may be used, but it is not limited thereto.

The electrolyte used in the present invention is a non-aqueous electrolyte and may comprise a cyclic carbonate and a linear carbonate. Examples of the cyclic carbonate include ethylene carbonate (EC), propylene carbonate (PC) and gamma-butyrolactone (GBL). Preferred examples of the linear carbonate include at least one carbonate selected from the group consisting of diethyl carbonate (DEC), dimethyl carbonate (DMC), ethylmethyl carbonate (EMC) and methylpropyl carbonate (MPC).

Additionally, the electrolyte used in the present invention comprises a lithium salt in addition to the carbonate compound. More particularly, the lithium salt is preferably selected from the group consisting of $LiClO_4$, $LiCF_3SO_3$, $LiPF_6$, $LiBF_4$, $LiAsF_6$ and $LiN(CF_3SO_2)_2$.

The lithium secondary battery according to the present invention is manufactured by a conventional method, i.e., by inserting a porous separator between a cathode and an anode and introducing an electrolyte.

Preferably, the lithium secondary battery according to the present invention is a cylindrical can-type battery, a prismatic battery or a pouch-type battery.

The Advanced Effect

As can be seen from the foregoing, according to the present invention, the compound represented by formula 1 is added to a cathode as an additive for a cathode active material to improve overdischarge characteristics. The additive for a cathode active material can provide lithium ions at least in such an amount as to compensate for the irreversible capacity of an anode. Accordingly, the anode voltage can be prevented from increasing during overdischarge by increasing the irreversibility of a cathode to cause the cathode voltage to be decreased rapidly, so that a battery capacity restorability of 90% or more may be obtained after overdischarge.

Additionally, according to the cathode active material for a lithium secondary battery, which comprises a lithium nickel oxide represented by formula 1 in which nickel is partially substituted with other elements (with the proviso that y is not 0), or a lithium nickel oxide represented by formula 1 that is surface-coated with an oxide other than lithium nickel oxides, as an additive for the cathode active material, capacity of a battery is not significantly reduced after overdischarge while maintaining overall performance of the battery. Further, it is possible to obtain excellent capacity restorability and to prevent a battery from swelling at a high temperature.

MODE FOR CARRYING OUT THE INVENTION

Reference will now be made in detail to the preferred embodiments of the present invention. It is to be understood that the following examples are illustrative only and the present invention is not limited thereto.

Example 1

A pouch-type bi-cell was manufactured by a conventional method. $LiCoO_2$ was used as a cathode active material and $Li_2NiO_2$ was added as an additive in the amount of 2 parts by weight based on 100 parts by weight of the cathode active material. More particularly, 78.4 wt % of $LiCoO_2$, 1.6 wt % of $Li_2NiO_2$, 10 wt % of KS-6 (conductive agent) and 10 wt % of PVDF (binder) were added to NMP as a solvent to form cathode mixture slurry, and then the slurry was coated on an Al collector to obtain a cathode. Additionally, artificial graphite and copper were used as an anode active material and an anode collector, respectively, and an EC/PC/DEC-based solution containing 1M $LiPF_6$ was used as an electrolyte to obtain a battery by a conventional method.

Example 2

Example 1 was repeated to obtain a battery, except that $Li_2NiO_2$ as an additive for a cathode active material was used in the amount of 5 parts by weight based on 100 parts by weight of the cathode active material.

Example 3

Example 1 was repeated to obtain a battery, except that $Li_2NiO_2$ as an additive for a cathode active material was used in the amount of 9 parts by weight based on 100 parts by weight of the cathode active material.

Comparative Example 1

Example 1 was repeated to obtain a battery, except that the additive for a cathode active material ($Li_2NiO_2$) was not used in the cathode.

Experimental Example 1

A three-pole test is performed for each of the bi-cells according to Examples 1 to 3 and Comparative Example 1. The results are shown in FIGS. 2 to 5. Generally, when the performance of a cell is evaluated by capacity, concept of full cell voltage is used. The full cell voltage is defined as the difference between the voltage of a cathode and that of an anode in the case of a cell having two electrodes of one cathode and one anode. A three-pole cell system includes lithium metal inserted into a cell as a reference electrode, in addition to a cathode and an anode. Such a three-pole system is used to determine the behavior of the cathode and anode in an actual cell during charge/discharge cycles, based on the reference electrode (lithium metal), by measuring the voltage difference between the reference electrode (lithium metal) and the cathode and the voltage difference between the reference electrode (lithium metal) and the anode, respectively.

Figure 1:
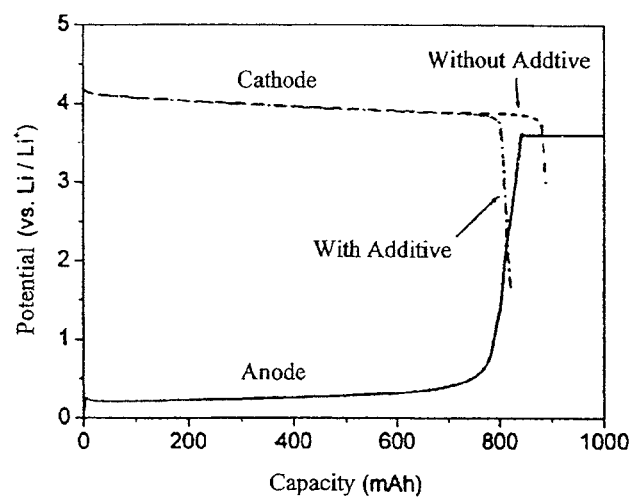
FIG. 1 is a graph showing cathode potential and anode potential, before and after using the additive for a cathode active material according to the present invention.
Figure 2:
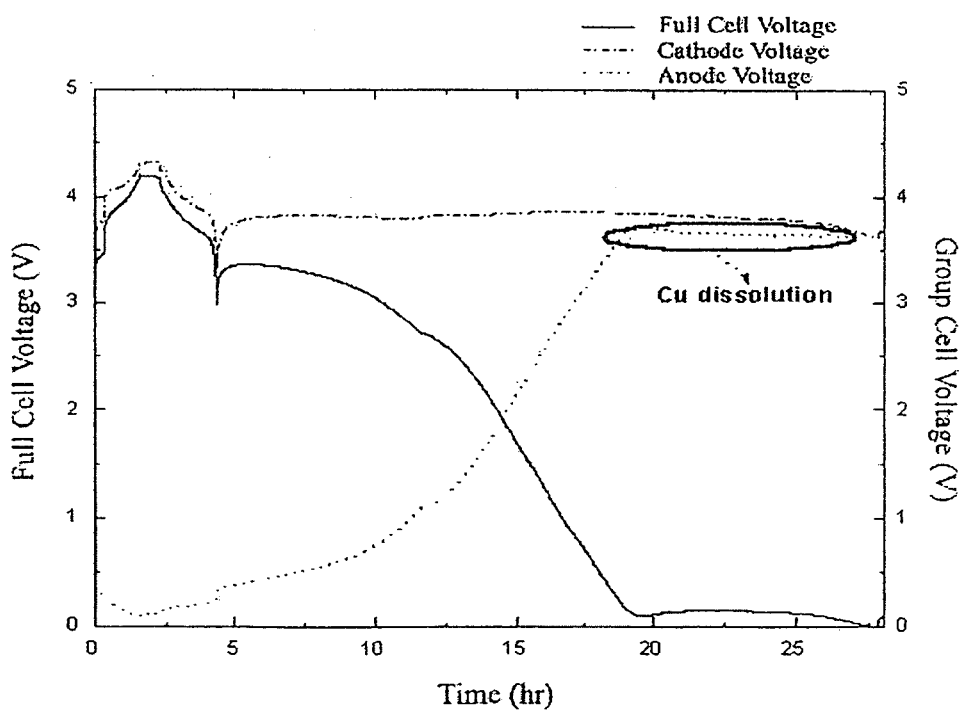
FIG. 2 is a graph showing the result of a three-pole test of the bi-cell obtained from Comparative Example 1.
Figure 3:
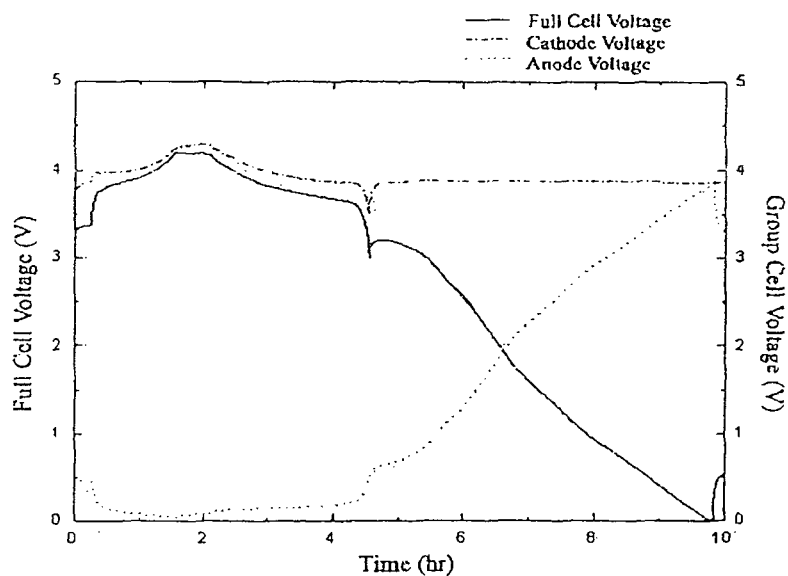
FIG. 3 is a graph showing the result of a three-pole test of the bi-cell obtained from Example 1 according to the present invention.
Figure 4:
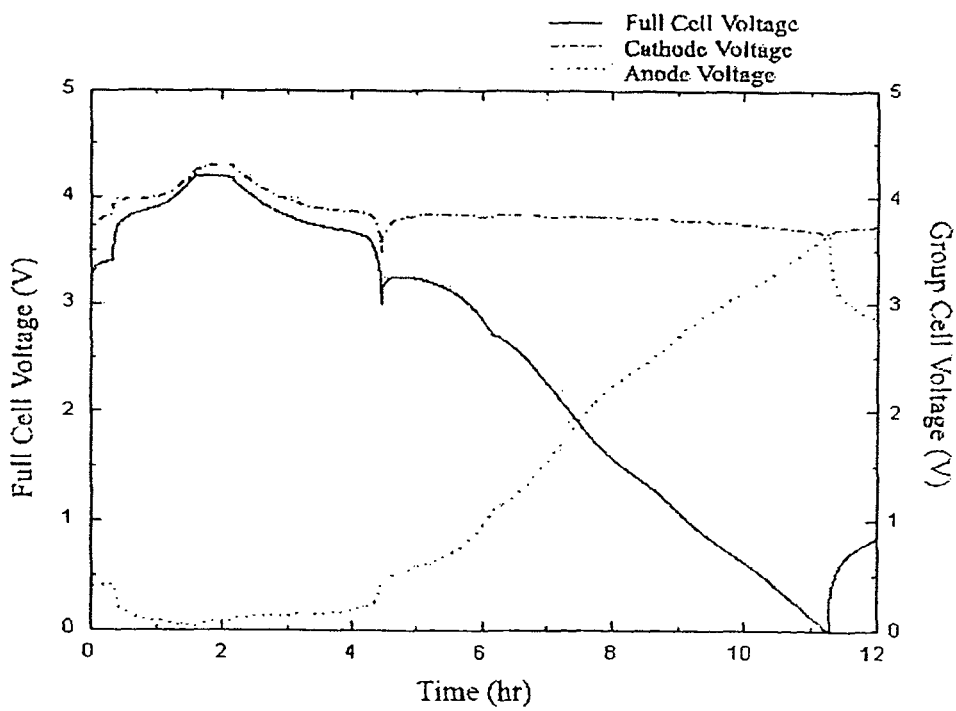
FIG. 4 is a graph showing the result of a three-pole test of the bi-cell obtained from Example 2 according to the present invention.
Figure 5:
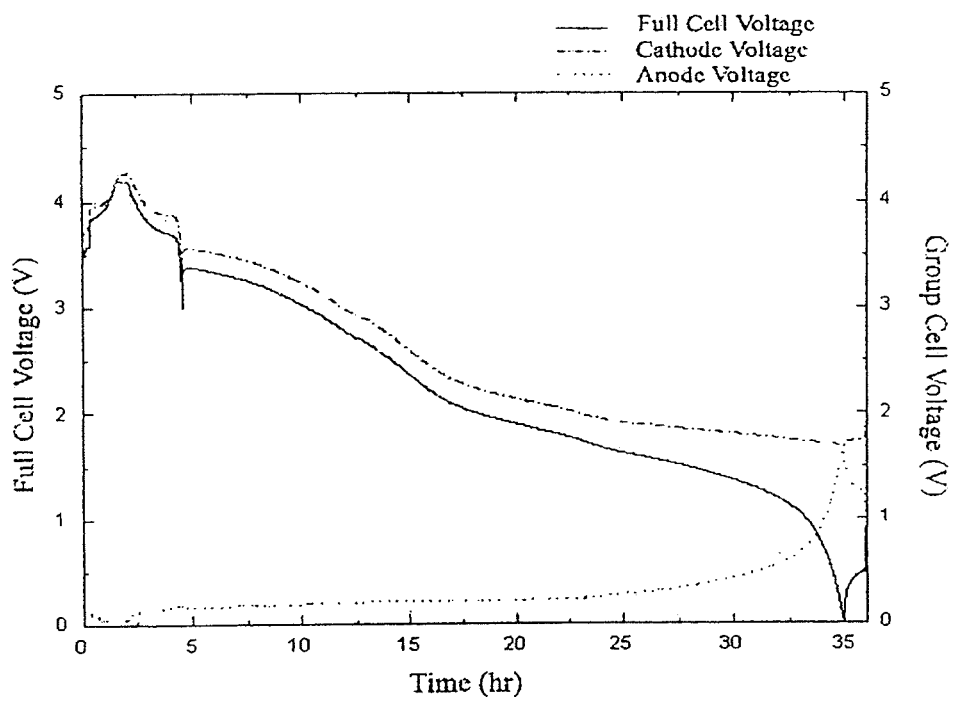
FIG. 5 is a graph showing the result of a three-pole test of the bi-cell obtained from Example 3 according to the present invention.

As shown in FIG. 2, in an overdischarge test, Comparative Example 1 shows a plateau (represented by a circle) in which copper ion dissolution occurs after the voltage of an anode increases. On the other hand, as shown in FIGS. 3 to 5, each of Examples 1 to 3 shows no plateau corresponding to copper ion dissolution.

Example 4

Figure 6:
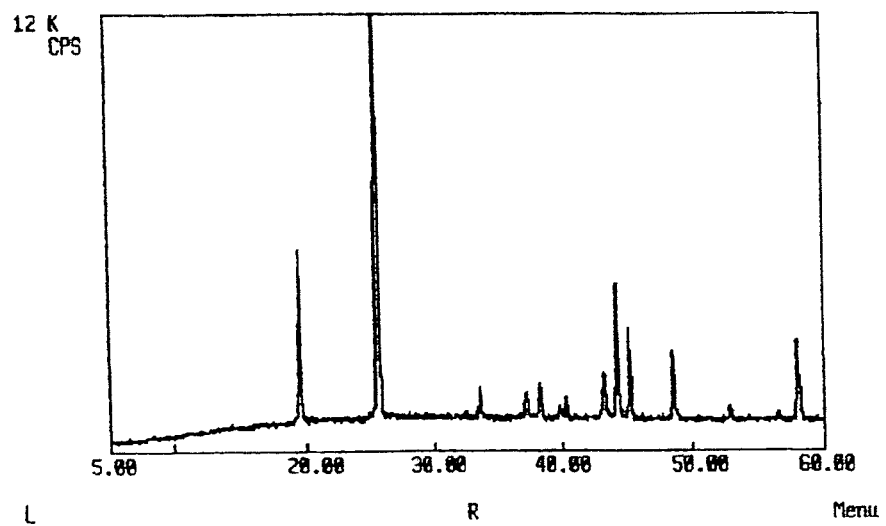
FIG. 6 is a diagram showing the X-ray diffraction pattern of the additive for a cathode active material prepared by the method as described in Example 4.

Lithium oxide as a lithium salt, nickel oxide as a nickel salt and aluminum nitrate as an aluminum salt used to substitute for nickel were mixed in an adequate equivalent ratio and then reacted in a solid phase at 600° C. to obtain $Li_2Ni_{0.97}Al_{0.03}O_2$ as an additive for a cathode active material. X-ray diffraction pattern of the additive for a cathode active material is shown in FIG. 6.

Figure 10:
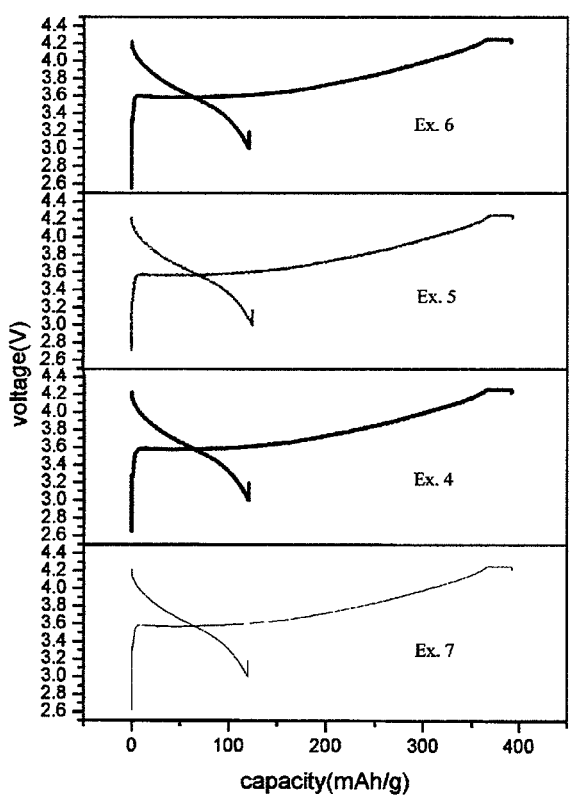
FIG. 10 is a graph showing the results of charge/discharge of batteries prepared by the methods as described in Examples 4 to 7.

Next, 92.12 wt % of $LiCoO_2$, 1.88 wt % of the additive for a cathode active material, 3 wt % of super-P (conductive agent) and 3 wt % of PVDF (binder) were added to NMP as a solvent to form cathode mixture slurry, and then the slurry was coated on an Al collector to obtain a cathode. Additionally, artificial graphite and copper were used as an anode active material and an anode collector, respectively, and an EC/PC/DEC-based solution containing 1M $LiPF_6$ was used as an electrolyte to obtain a battery by a conventional method. Charge/discharge capacity of the battery is shown in FIG. 10.

Figure 11:
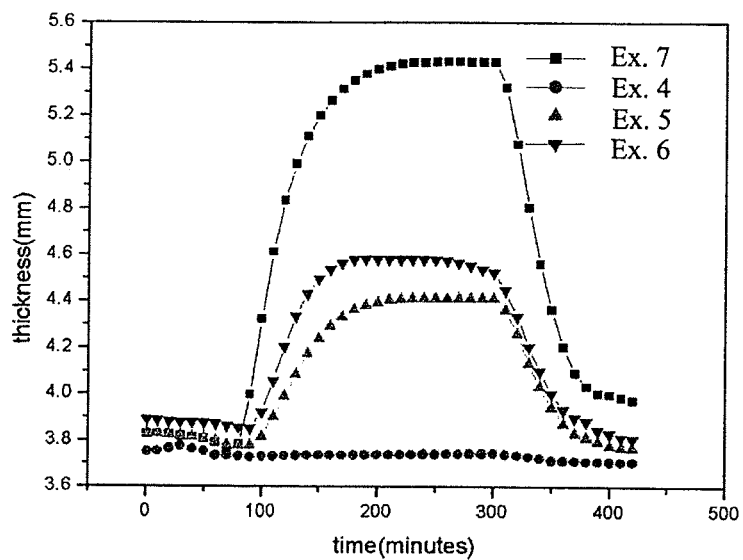
FIG. 11 is a graph showing the change in thickness of the pouch type batteries containing the additives for a cathode active material prepared by the methods as described in Examples 4 to 7, after the batteries are stored at a high temperature.

Further, the pouch type battery was charged to 4.2V at 0.2 C, heated from room temperature to 90° C. for 1 hour, stored at 90° C. for 4 hours and then cooled back to room temperature for 1 hour. At this time, change in thickness of the battery was measured. The result is shown in FIG. 11. The overdischarge test result of the battery is shown in Table 1 and FIG. 12.

Example 5

Figure 7:
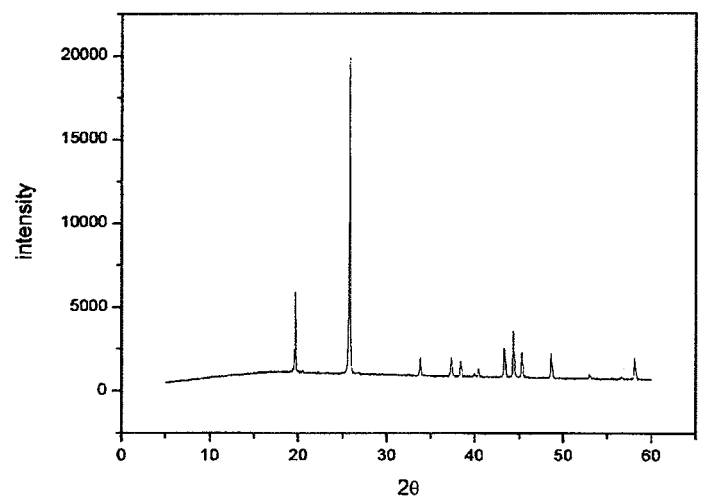
FIG. 7 is a diagram showing the X-ray diffraction pattern of the additive for a cathode active material prepared by the method as described in Example 5.

Example 4 was repeated to obtain $Li_2Ni_{0.97}Mg_{0.03}O_2$ as an additive for a cathode active material, except that magnesium was used as an element substituting for nickel. X-ray diffraction pattern of the additive for a cathode active material is shown in FIG. 7. A battery was manufactured by using the additive for a cathode active material in the same manner as described in Example 4. Charge/discharge capacity of the battery is shown in FIG. 10.

By using the same method as described in Example 4, change in thickness of the pouch type battery was measured after the battery was stored at a high temperature. The result is shown in FIG. 11. Additionally, the overdischarge test result of the battery is shown in Table 1 and FIG. 12.

Example 6

Figure 8:
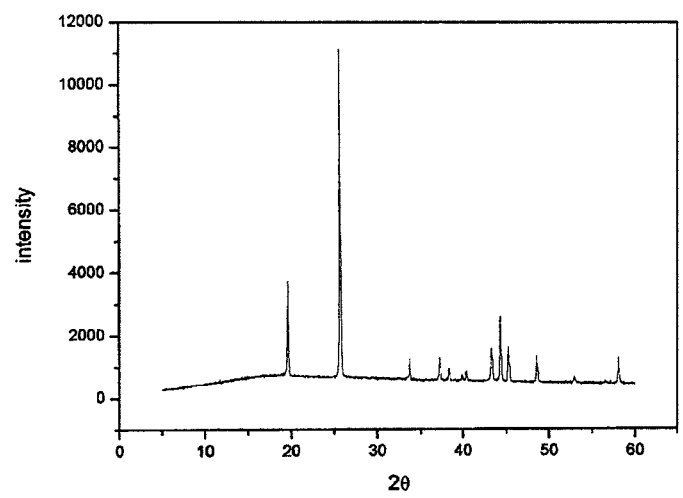
FIG. 8 is a diagram showing the X-ray diffraction pattern of the additive for a cathode active material prepared by the method as described in Example 6.

Example 4 was repeated to obtain $Li_2Ni_{0.97}B_{0.03}O_2$ as an additive for a cathode active material, except that boron was used as an element substituting for nickel. X-ray diffraction pattern of the additive for a cathode active material is shown in FIG. 8. A battery was manufactured by using the additive for a cathode active material in the same manner as described in Example 4. Charge/discharge capacity of the battery is shown in FIG. 10.

By using the same method as described in Example 4, change in thickness of the pouch type battery was measured after the battery was stored at a high temperature. The result is shown in FIG. 11. Additionally, the overdischarge test result of the battery is shown in Table 1.

Example 7

Figure 9:
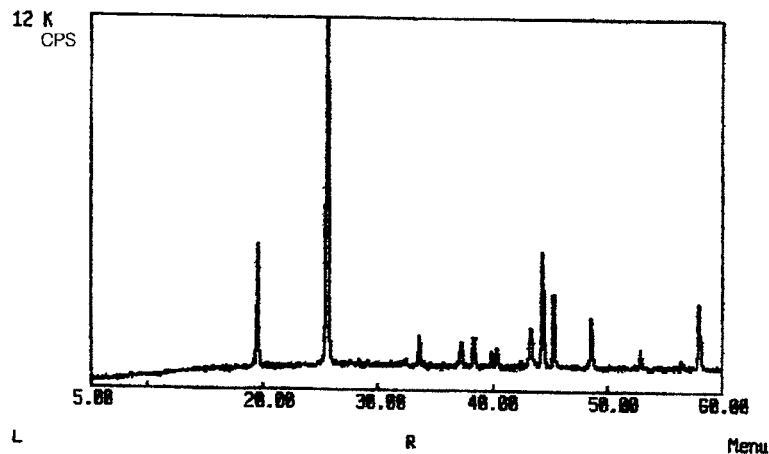
FIG. 9 is a diagram showing the X-ray diffraction pattern of the additive for a cathode active material prepared by the method as described in Example 7.

A lithium salt and a nickel salt were mixed in an adequate equivalent ratio and reacted together in an electric furnace to obtain $Li_2NiO_2$ as an additive for a cathode active material. X-ray diffraction pattern of the additive for a cathode active material is shown in FIG. 9. A battery was manufactured by using the additive for a cathode active material in the same manner as described in Example 4. Charge/discharge capacity of the battery is shown in FIG. 10.

By using the same method as described in Example 4, change in thickness of the pouch type battery was measured after the battery was stored at a high temperature. The result is shown in FIG. 11. Additionally, the overdischarge test result of the battery is shown in Table 1 and FIG. 12.

Comparative Example 2

Figure 13:
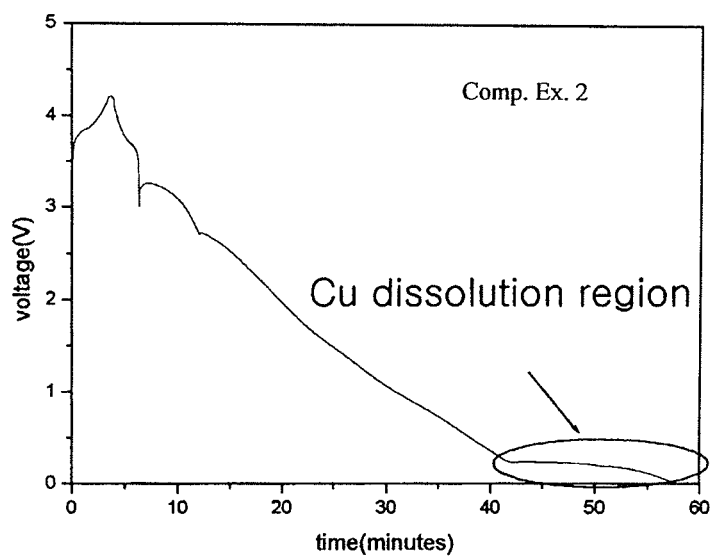
FIG. 13 is a graph showing the overdischarge test result of the pouch type battery manufactured by the method as described in Comparative Example 2.

Example 4 was repeated to obtain a battery, except that the additive for a cathode active material was not added to the cathode active material. The overdischarge test result of the battery is shown in Table 1 and FIG. 13.

TABLE 1

|  | Discharge capacity before overdischarge (0.2 C)/mA | Discharge capacity after overdischarge (0.2 C)/mA | Capacity restorability after overdischarge (%) |
| --- | --- | --- | --- |
| Ex. 7 | 732 | 682 | 93.2% |
| Comp. Ex. 2 | 728 | 464 | 63.7% |
| Ex. 4 | 742 | 699 | 94.2% |
| Ex. 5 | 738 | 687 | 93.1% |
| Ex. 6 | 729 | 673 | 92.3% |

Figure 12:
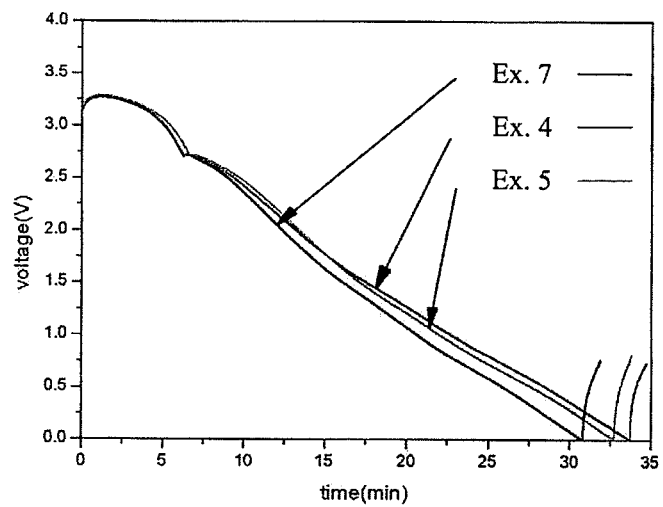
FIG. 12 is a graph showing the overdischarge test results of the pouch type batteries containing the additives for a cathode active material prepared by the methods as described in Examples 4, 5 and 7.

As can be seen from Table 1 and FIGS. 10 and 12, each of the batteries obtained from Examples 4 to 7 shows similar charge/discharge efficiency. Capacity of each battery is not significantly reduced even after overdischarge and each battery has excellent capacity restorability after overdischarge. Additionally, as shown in Table 1 and FIG. 13, the battery obtained from Comparative Example 2 (to which the additive for a cathode active material for improving overdischarge characteristics according to the present invention is not added) shows poor overdischarge characteristics compared to other batteries.

However, as can be seen from FIG. 11, Example 4 using $Li_2Ni_{0.97}Al_{0.03}O_2$ as an additive for a cathode active material for improving overdischarge characteristics shows little change in battery thickness. Examples 5 and 6 using $Li_2Ni_{0.97}Mg_{0.03}O_2$ and $Li_2Ni_{0.97}3_{0.03}O_2$ as an additive for a cathode active material, respectively, show smaller change in battery thickness compared to Example using $Li_2NiO_2$ as an additive for a cathode active material. This indicates that each additive for a cathode active material for improving overdischarge characteristics according to Examples 4 to 6 provides excellent effect of preventing a battery from swelling at high temperature compared to the additive according to Example 7.

Example 8

Figure 14:
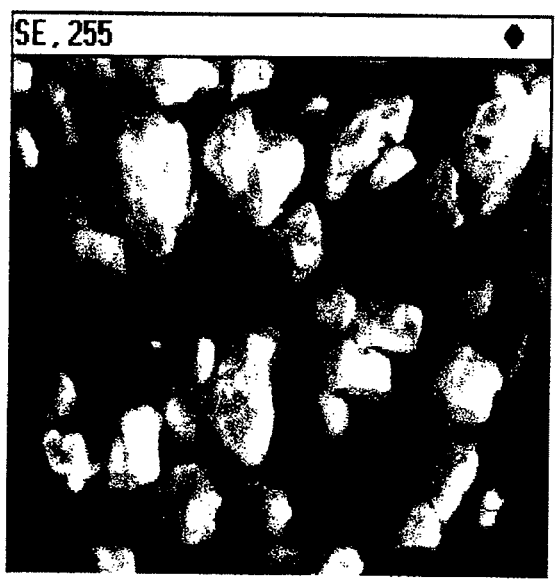
FIGS. 14 and 15 are results according to SEM (scanning electron microscope) and EDS (Energy Dispersive X-ray Spectrometer) analysis of the additive for a cathode active material prepared by the method as described in Example 8, respectively.
Figure 15:
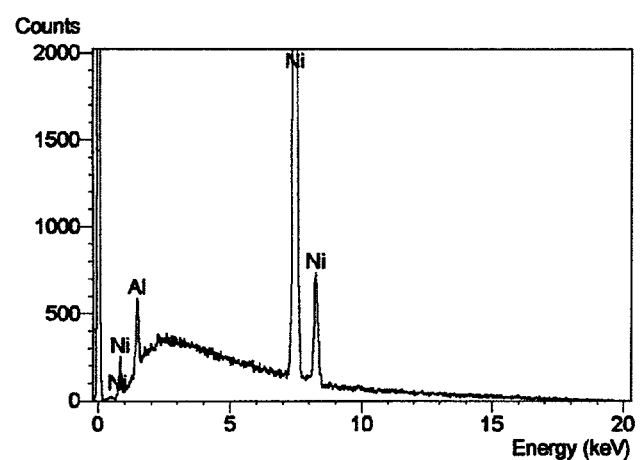

3 mol % of aluminum isopropoxide based on $Li_2NiO_2$ was dissolved in ethanol. $Li_2NiO_2$ obtained by reacting a lithium salt with a nickel salt in an electric furnace at 600° C. was added thereto to form slurry. The slurry was filtered through a depressurization filter to obtain a filtered product and the filtered product was completely dried in an oven at 80° C. to obtain a final product. The final product was analyzed by SEM and EDS. The results are shown in FIGS. 14 and 15, respectively.

Figure 20:
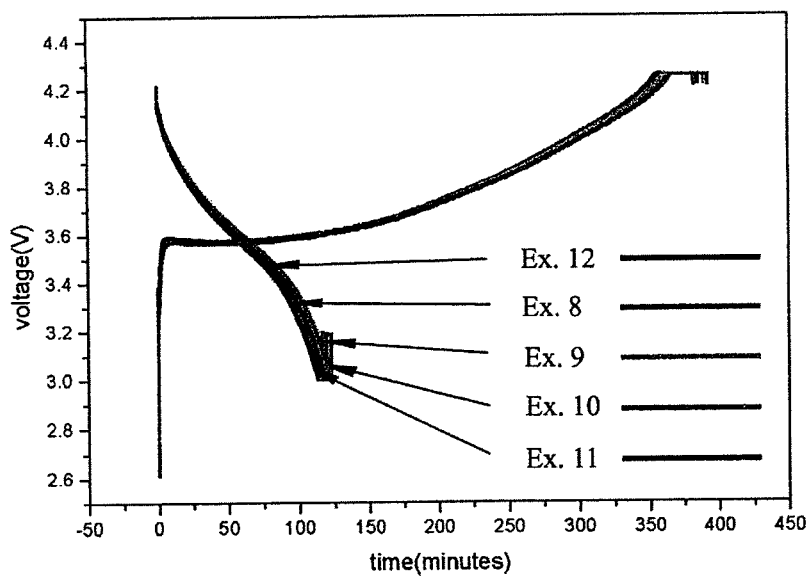
FIG. 20 is a graph showing the charge/discharge capacity of the batteries obtained from Examples 8 to 12.

Next, 90.24 wt % of $LiCoO_2$, 1.88 wt % of the above-described final product as an additive for a cathode active material, 3 wt % of super-P (conductive agent) and 3 wt % of PVDF (binder) were added to NMP as a solvent to form cathode mixture slurry, and then the slurry was coated on an Al collector to obtain a cathode. Additionally, artificial graphite and copper were used as an anode active material and an anode collector, respectively, and an EC/PC/DEC-based solution containing 1M $LiPF_6$ was used as an electrolyte to obtain a battery by a conventional method. Charge/discharge capacity of the battery is shown in FIG. 20.

Figure 21:
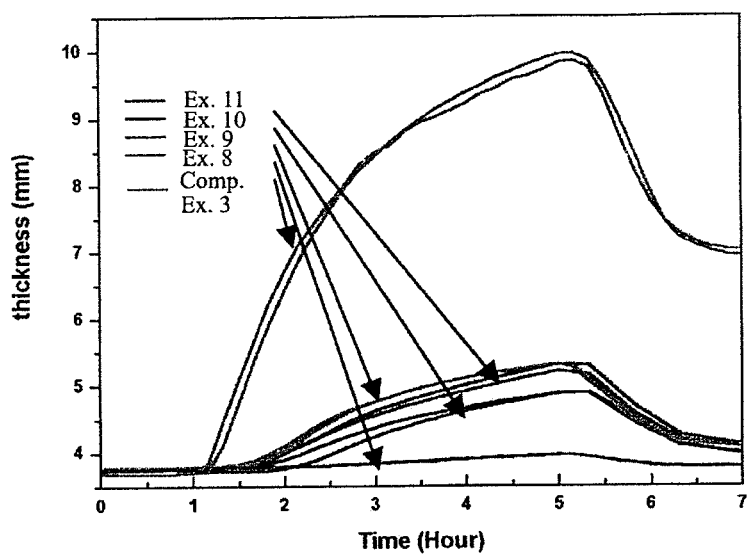
FIG. 21 is a graph showing the change in thickness of the pouch type batteries containing the additives for a cathode active material prepared by the methods as described in Examples 8 to 12, after the batteries are stored at a high temperature.

Further, the pouch type battery was charged to 4.2V at 0.2 C, heated from room temperature to 90° C. for 1 hour, stored at 90° C. for 4 hours and then cooled back to room temperature for 1 hour. At this time, change in thickness of the battery was measured. The result is shown in FIG. 21. The overdischarge test result of the battery is shown in Table 2 and FIG. 22.

Example 9

Example 8 was repeated to obtain an additive for a cathode active material and to manufacture a battery, except that the slurry was separated from the solvent by means of a precipitation method instead of using a depressurization filter. Charge/discharge capacity of the battery is shown in FIG. 20.

By using the same method as described in Example 8, change in thickness of the battery was measured after the battery was stored at a high temperature. The result is shown in FIG. 21. Additionally, the overdischarge test result of the battery is shown in Table 2 and FIG. 22.

Example 10

Example 8 was repeated to obtain an additive for a cathode active material and to manufacture a battery, except that the slurry was dried in a depressurization drier instead of filtering with a depressurization filter. Charge/discharge capacity of the battery is shown in FIG. 20.

By using the same method as described in Example 8, change in thickness of the battery was measured after the battery was stored at a high temperature. The result is shown in FIG. 21. Additionally, the overdischarge test result of the battery is shown in Table 2 and FIG. 22.

Example 11

Figure 16:
FIGS. 16 and 17 are results according to SEM and EDS analysis of the additive for a cathode active material prepared by the method as described in Example 11, respectively.
Figure 17:
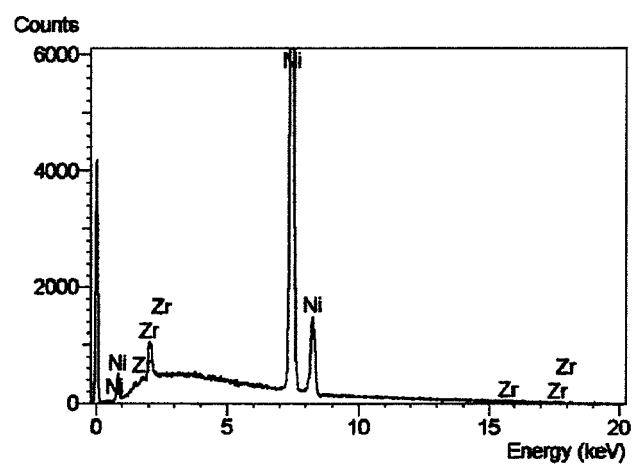

Example 8 was repeated to obtain an additive for a cathode active material, except that zirconium propoxide was used instead of aluminum isopropoxide. The additive was analyzed by SEM and EDS. The results are shown in FIGS. 16 and 17, respectively. A battery was manufactured by using the additive in the same manner as described in Example 8. Charge/discharge capacity of the battery is shown in FIG. 20.

By using the same method as described in Example 8, change in thickness of the battery was measured after the battery was stored at a high temperature. The result is shown in FIG. 21. Additionally, the overdischarge test result of the battery is shown in Table 2 and FIG. 22.

Example 12

Figure 18:
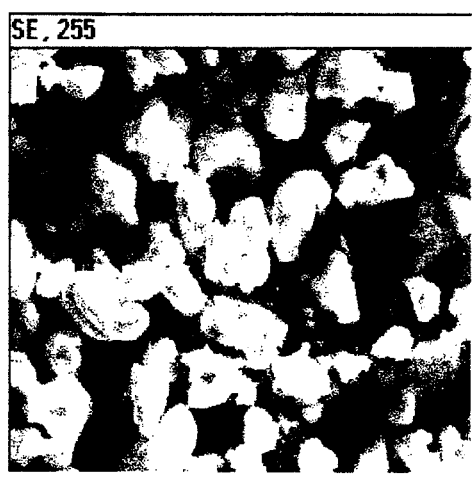
FIGS. 18 and 19 are results according to SEM and EDS analysis of the additive for a cathode active material prepared by the method as described in Example 12, respectively.
Figure 19:
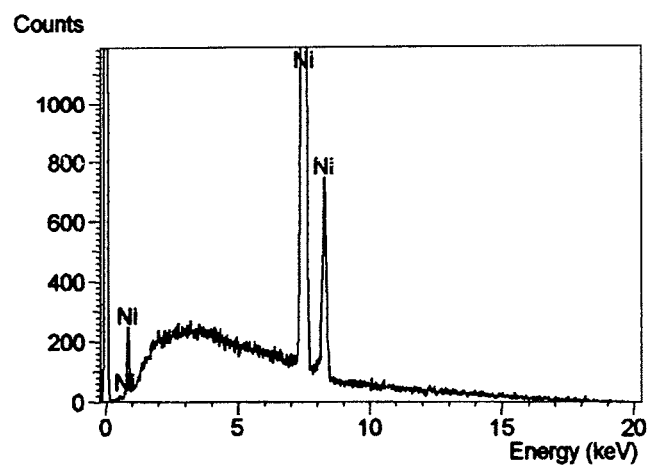

A lithium salt was reacted with a nickel salt in an electric furnace at 600° C. to obtain $Li_2NiO_2$. $Li_2NiO_2$ was analyzed by SEM and EDS. The results are shown in FIGS. 18 and 19, respectively. A battery was manufactured in the same manner as described in Example 8, except that $Li_2NiO_2$ was used as an additive for a cathode active material. Charge/discharge capacity of the battery is shown in FIG. 20.

By using the same method as described in Example 8, change in thickness of the battery was measured after the battery was stored at a high temperature. The result is shown in FIG. 21. Additionally, the overdischarge test result of the battery is shown in Table 2 and FIG. 22.

Comparative Example 3

A battery was manufactured in the same manner as described in Example 8, except that no additive for a cathode active material was used. By using the same method as described in Example 8, change in thickness of the battery was measured after the battery was stored at a high temperature. The result is shown in FIG. 21. Additionally, the overdischarge test result of the battery is shown in Table 2 and FIG. 13.

TABLE 2

|  | Discharge capacity before overdischarge (0.2 C)/mA | Discharge capacity after overdischarge (0.2 C)/mA | Capacity restorability after overdischarge % |
|---|---|---|---|
| Ex. 12 | 734 | 712 | 97.0% |
| Comp. Ex. 3 | 728 | 464 | 63.7% |
| Ex. 8 | 729 | 715 | 98.1% |
| Ex. 9 | 717 | 704 | 98.2% |
| Ex. 10 | 728 | 702 | 96.4% |
| Ex. 11 | 715 | 685 | 95.8% |

As shown in FIGS. 15, 17 and 19, each additive for a cathode active material for improving overdischarge characteristics, obtained from Examples 8 and 11, comprises a lithium nickel oxide surface-coated with a material other than lithium nickel oxides. However, as can be seen from FIGS. 14, 16 and 18, such surface-coating does not change the structure of each additive for a cathode active material for improving overdischarge characteristics, significantly.

Figure 22:
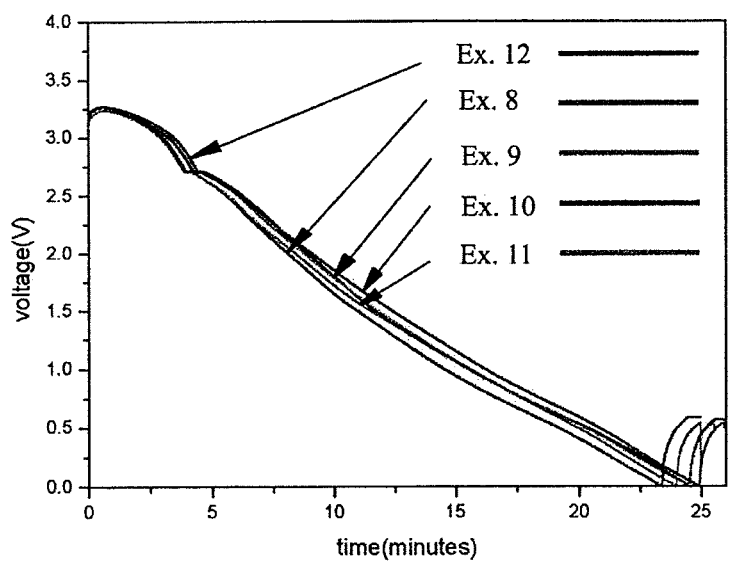
FIG. 22 is a graph showing the overdischarge test results of the pouch type batteries obtained from Examples 8 to 12.
Figure 23:
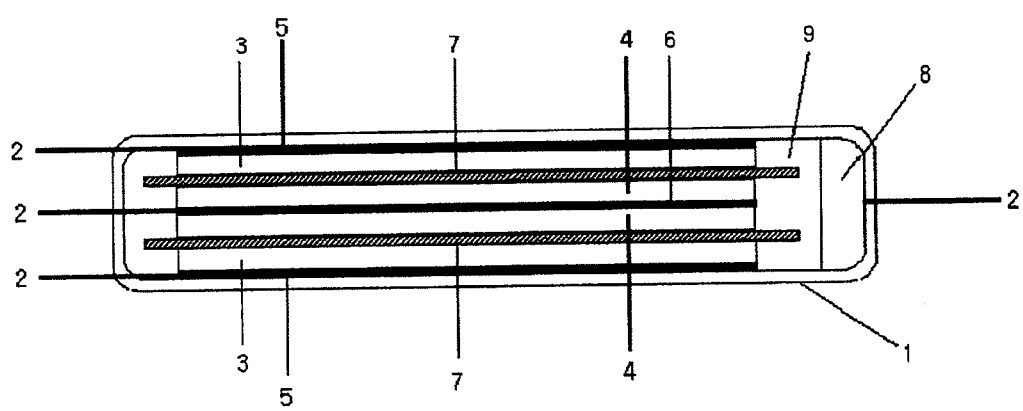
FIG. 23 is a sectional view of a general pouch type battery used in the following Examples and Comparative Examples, wherein reference numeral 1 is a pouch, 2 is a lid, 3 is a cathode, 4 is an anode, 5 is a cathode current collector, 6 is an anode current collector, 7 is a separator, 8 is lithium metal, and 9 is an electrolyte.

Additionally, as shown in Table 2 and FIGS. 20 and 22, each battery obtained from Examples 8 to 12 shows similar charge/discharge efficiency. Capacity of each battery is not significantly reduced even after overdischarge and each battery has excellent capacity restorability after overdischarge. On the other hand, as shown in Table 2 and FIG. 13, the battery obtained from Comparative Example 3 (to which the additive for a cathode active material for improving overdischarge characteristics according to the present invention is not added) shows poor overdischarge characteristics compared to other batteries.

However, as can be seen from FIG. 21, Example 8 shows little change in battery thickness. Examples 9 to 11 show smaller change in battery thickness compared to Example 12. This indicates that each additive for a cathode active material for improving overdischarge characteristics according to Examples 8 to 11 provides excellent effect of preventing a battery from swelling at a high temperature compared to the additive according to Example 12.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A cathode active material for a lithium secondary battery containing a lithium transition metal oxide capable of lithium ion intercalation/deintercalation, which further comprises a lithium nickel oxide represented by the following formula 2 in which nickel is partially substituted with other elements, as an additive in an amount of 0.1 to 2 parts by weight based on 100 parts by weight of the total cathode active material:

$$Li_{2+x}Ni_{1-y}M_yO_{2+a} \quad \text{[formula 2]}$$

wherein, x is a number satisfying $-0.5 \leq x \leq 0.5$, y is a number satisfying $0<y<1$, a is a number satisfying $0 \leq a<0.3$, and M is at least one element selected from the group consisting of B and Al wherein the lithium transition metal oxide is at least one selected from the group consisting of $LiCoO_2$, $LiNiO_2$, $LiMnO_2$, $LiMn_2O_4$, $Li(Ni_aCo_bMn_c)O_2$, $LiNi_{1-d}O_2$, $LiCo_{1-d}Mn_dO_2$, $LiNi_{1-d}Mn_dO_2$, $Li(Ni_xCo_yMn_z)O_4$, $LiMn_{2-n}Ni_nO_4$, $LiMn_{2-n}Co_nO_4$, $LiCoPO_4$ and $LiFePO_4$, wherein $0<a<1$, $0<b<1$, $0<c<1$, $0<d<0$, $a+b+c=1$, $0<x<2$, $0<y<2$, $0<z<2$, $x+y+z=2$, and $0<n<2$.

2. The cathode active material according to claim 1, wherein the lithium nickel oxide represented by formula 2 belongs to a space group Immm.

3. The cathode active material according to claim 2, wherein the lithium nickel oxide represented by formula 2 forms a tetra-coordinated planar structure, $(Ni,M)O_4$ and two tetra-coordinated planar structures facing to each other share one side formed by O—O so as to form a primary chain.

4. The cathode active material according to claim 2, wherein the compound represented by formula 2 has the following lattice constants: $a=3.7\pm0.5$ Å, $b=2.8\pm0.5$ Å, $c=9.2\pm0.5$ Å, $\alpha=90°$, $\beta=90°$ and $\gamma=90$.

5. The cathode active material according to claim 1, wherein in the lithium nickel oxide represented by formula 2, a is a number satisfying $0<a<0.3$.

6. The cathode active material according to claim 1, wherein in the lithium nickel oxide represented by formula 2, M is B.

7. A lithium secondary battery comprising a cathode, an anode, a separator and a non-aqueous electrolyte containing a lithium salt and an electrolyte compound,
wherein the cathode comprises the cathode active material containing a lithium transition metal oxide capable of lithium ion intercalation/deintercalation, which further comprises a lithium nickel oxide represented by the following formula 2 in which nickel is partially substituted with other elements, as an additive in an amount of 0.1 to 2 parts by weight based on 100 parts by weight of the total cathode active material:

$$Li_{2+x}Ni_{1-y}M_yO_{2+a} \quad \text{[formula 2]}$$

wherein, x is a number satisfying $-0.5 \leq x \leq 0.5$, y is a number satisfying $0<y<1$, a is a number satisfying $0 \leq a<0.3$, and M is at least one element selected from the group consisting of B and Al wherein the lithium transition metal oxide is at least one selected from the group consisting of $LiCoO_2$, $LiNiO_2$, $LiMnO_2$, $LiMn_2O_4$, $Li(Ni_aCo_bMn_c)O_2$, $LiNi_{1-d}O_2$, $LiCo_{1-d}Mn_dO_2$, $LiNi_{1-d}Mn_dO_2$, $Li(Ni_xCo_yMn_z)O_4$, $LiMn_{2-n}Ni_nO_4$, $LiMn_{2-n}Co_nO_4$, $LiCoPO_4$ and $LiFePO_4$, wherein $0<a<1$, $0<b<1$, $0<c<1$, $0<d<0$, $a+b+c=1$, $0<x<2$, $0<y<2$, $0<z<2$, $x+y+z=2$, and $0<n<2$.

8. The lithium secondary battery according to claim 7, wherein the lithium nickel oxide represented by formula 2 belongs to a space group Immm.

9. The lithium secondary battery according to claim 8, wherein the lithium nickel oxide represented by formula 2 forms a tetra-coordinated planar structure, $(Ni,M)O_4$ and two tetra-coordinated planar structures facing to each other share one side formed by O—O so as to form a primary chain.

10. The lithium secondary battery according to claim 8, wherein the compound represented by formula 2 has the following lattice constants: a=3.7±0.5 Å, b=2.8±0.5 Å, c=9.2±0.5 Å, α=90°, β=90° and γ=90.

11. The lithium secondary battery according to claim 7, wherein the lithium salt is at least one selected from the group consisting of $LiClO_4$, $LiCF_3SO_3$, $LiPF_6$, $LiBF_4$, $LiAsF_6$ and $LiN(CF_3SO_2)_2$, and the electrolyte compound is at least one carbonate selected from the group consisting of ethylene carbonate, propylene carbonate, gamma-butyrolactone, diethyl carbonate, dimethyl carbonate, ethylmethyl carbonate and methylpropyl carbonate.

12. The lithium secondary battery according to claim 7, wherein in the lithium nickel oxide represented by formula 2, a is a number satisfying 0<a<0.3.

13. The lithium secondary battery according to claim 7, wherein in the lithium nickel oxide represented by formula 2, M B.

\* \* \* \* \*